United States Patent
Fredricks (10) Patent No.: US 8,230,815 B2
(45) Date of Patent: Jul. 31, 2012

(54) AQUARIUM LIGHT STRIP

(75) Inventor: Dennis Fredricks, Escondido, CA (US)

(73) Assignee: Current USA, Vista, CA (US)

(*) Notice: Subject to any disclaimer, the term of this patent is extended or adjusted under 35 U.S.C. 154(b) by 0 days.

(21) Appl. No.: 12/760,389

(22) Filed: Apr. 14, 2010

(65) Prior Publication Data

US 2011/0253056 A1    Oct. 20, 2011

(51) Int. Cl.
*A01K 63/06* (2006.01)
(52) U.S. Cl. .................................... 119/266; 119/267
(58) Field of Classification Search ............ 119/245, 119/247, 250, 265–267, 269; 362/227, 228, 362/229, 230, 231, 232, 233, 234, 235, 236, 362/237, 238, 239, 240, 241, 242, 243, 244, 362/245, 246, 247, 248, 249.01, 249.02, 362/249.03, 249.04, 249.05, 249.06, 249.07, 362/249.08, 249.09, 249.1, 249.11, 249.12, 362/249.13, 249.14, 249.15, 249.16, 249.17, 362/249.18, 249.19
See application file for complete search history.

(56) References Cited

U.S. PATENT DOCUMENTS

| | | | |
|---|---|---|---|
| 2,988,312 A | 6/1961 | Dumas | |
| 3,687,110 A * | 8/1972 | Braunhut | 119/6.5 |
| 3,805,740 A * | 4/1974 | Hall | 119/266 |
| 3,828,176 A | 8/1974 | Goldman et al. | |
| 3,834,351 A | 9/1974 | Schmidt | |
| 4,694,223 A * | 9/1987 | Campolo | 315/118 |
| 4,727,448 A * | 2/1988 | Hanyuda et al. | 361/18 |
| 4,994,943 A | 2/1991 | Aspenwall | |
| 5,089,940 A | 2/1992 | Lanzarone et al. | |
| 5,165,778 A | 11/1992 | Matthias et al. | |
| 5,211,469 A | 5/1993 | Matthias et al. | |
| 5,307,762 A * | 5/1994 | Englert | 119/266 |
| 5,848,837 A | 12/1998 | Gustafson | |
| 5,873,326 A * | 2/1999 | Davet et al. | 119/245 |
| 5,927,845 A | 7/1999 | Gustafson et al. | |
| 5,943,198 A * | 8/1999 | Hirsh et al. | 361/42 |
| 6,029,604 A * | 2/2000 | de Vosjoli et al. | 119/246 |
| 6,065,849 A | 5/2000 | Chen | |
| 6,166,496 A | 12/2000 | Lys et al. | |
| 6,184,628 B1 | 2/2001 | Ruthenberg | |
| 6,187,394 B1 * | 2/2001 | Johnson et al. | 428/13 |
| 6,523,976 B1 * | 2/2003 | Turnbull et al. | 362/231 |
| 6,577,080 B2 | 6/2003 | Lys et al. | |
| 6,673,292 B1 | 1/2004 | Gustafson et al. | |
| 6,781,329 B2 | 8/2004 | Mueller et al. | |
| 6,921,182 B2 | 7/2005 | Anderson, Jr. et al. | |
| 6,967,448 B2 | 11/2005 | Morgan et al. | |

(Continued)

FOREIGN PATENT DOCUMENTS

DE         4218880         7/1993
(Continued)

*Primary Examiner* — Rob Swiatek
*Assistant Examiner* — Ebony Evans
(74) *Attorney, Agent, or Firm* — David E. Heisey; Sheppard Mullin Richter & Hampton (57) ABSTRACT

A lighting system and apparatus that may be utilized with aquariums. The features and functionality of the lighting system and apparatus provide easy access to the opening of an aquarium for various purposes, such as cleaning and maintenance. In addition, the features and functionality of some embodiments provide a lighting system that does not require ballasts, light sockets, or a multitude of wiring, and includes a modular design. Further, for some embodiments, features of the present invention allow the lighting apparatus to illuminate the aquarium, while simultaneously limiting the evaporation of water from the aquarium.

26 Claims, 8 Drawing Sheets

U.S. PATENT DOCUMENTS

| | | | |
|---|---|---|---|
| 7,024,814 B1 * | 4/2006 | McDougle | 43/57 |
| 7,168,862 B2 | 1/2007 | Qi et al. | |
| 7,185,997 B2 * | 3/2007 | Simoni | 362/108 |
| 7,187,141 B2 | 3/2007 | Mueller et al. | |
| 7,220,018 B2 | 5/2007 | Crabb et al. | |
| 7,221,104 B2 | 5/2007 | Lys et al. | |
| 7,258,459 B2 | 8/2007 | Wang | |
| 7,427,840 B2 | 9/2008 | Morgan et al. | |
| 7,453,217 B2 | 11/2008 | Lys et al. | |
| 7,473,008 B2 | 1/2009 | Crabb et al. | |
| 7,482,764 B2 | 1/2009 | Morgan et al. | |
| 2003/0137829 A1 * | 7/2003 | Ayers | 362/101 |
| 2005/0109285 A1 * | 5/2005 | Hickok et al. | 119/266 |

FOREIGN PATENT DOCUMENTS

GB 2266043 10/1993

* cited by examiner

AQUARIUM LIGHT STRIP

FIELD OF THE INVENTION

The present invention relates to lighting apparatus and, more particularly, some embodiments are directed toward lighting apparatus used in conjunction with aquariums.

DESCRIPTION OF THE RELATED ART

Conventional aquarium light fixtures are generally composed of a shaded lamp affixed above the opening of an aquarium. In order to attach the fixture to the aquarium, typical methods include placing the fixture over the aquarium whereby the entire aquarium opening is covered, and using rods/legs that extend out from the fixture and attach to the top of the sidewalls of the aquarium. These rods/legs elevate the light fixture above the aquarium opening and allow the rod/legs to clamp onto the aquarium. Further methods of attachment include custom ordered aquarium light fixtures that are made to order based on the specific size of the aquarium's opening.

However, these light fixtures with conventional attachment methods lead to reduced access to the aquarium opening. Light fixtures such as these usually require removal of some or all of the light fixture before the aquarium can be accessed for service or cleaning. In addition, light fixtures that use attachment methods involving rods/legs may result in damage to the aquarium, or encounter problems fitting the aquarium due to the incompatibility of the fixture with the aquarium.

BRIEF SUMMARY OF EMBODIMENTS OF THE INVENTION

Various embodiments of the present invention provide a lighting system and apparatus that may be utilized with aquariums. The features and functionality of the lighting system and apparatus provide easy access to the opening of an aquarium for various purposes, such as cleaning and maintenance. In addition, the features and functionality of some embodiments provide for a lighting system that does not require ballasts, light sockets, or a multitude of wiring, and includes a modular design. Further, for some embodiments, features of the present invention allow the lighting apparatus to illuminate the aquarium, while simultaneously limiting the evaporation of water from the aquarium.

Regarding maintenance, in some embodiments the modular design of the lighting system provides easy access and maintenance of the various components of the system. For example, in some embodiments, not all the light fixtures need be to removed or rendered ineffective if the power supply fails. Rather, upon the failure of a modular light fixture, or the failure of a power supply unit to a modular light fixture, the failed component may be removed and replaced without disturbance of the functional components.

It should be noted that although the present invention is described within the context of aquariums, it will be appreciated by those of ordinary skill in the art that various embodiments of the present invention may also be utilized in applications other than aquariums, such as in the field of horticulture.

According to one embodiment, an aquarium lighting system is provided, comprising: a modular light fixture, comprising: an internal frame; a light element mounted to the internal frame; a heat sink, wherein the heat sink is mounted to the internal frame or light strip and configured to dissipate heat generated by the light element; a clear acrylic cover that covers the internal frame and the light element from water exposure; and a power supply unit that is electrically coupled to the modular light fixture through a terminal strip, wherein the power supply unit supplies power to the modular light fixture. In some embodiments, the power supply unit is located on the modular light fixture.

Depending on the embodiment, the power supply unit may be electrically coupled to the modular light fixture through a terminal strip, where the terminal strip provides a screw-less connection between the power supply unit and the modular light fixture. For some such embodiments, the terminal strip utilizes a tabbed connection mechanism or a clip-connection mechanism to connect the power supply to the modular light fixture. In further such embodiments, the power supply unit is a direct current driver and the aquarium lighting system further comprises a second terminal strip, wherein the second terminal strip connects the direct current driver to an alternating current power supply.

In other such embodiments, the aquarium light further comprises a mounting mechanism configured to mount the modular light fixture onto an aquarium wall. Optionally, the clear acrylic cover can be configured with a silicon gasket that covers one or more lighting elements to protect it from exposure to water.

In some embodiments, the internal frame, the heat sink, or both are constructed of aluminum. Further, in some embodiments, the modular light fixture is configured as a light strip housing a series of light elements.

The light element may be mounted on a printed circuit board and the printed circuit board mounted to the internal frame. Additionally, the light element may be removable. Depending on the embodiment, the light elements utilized may include light emitting diodes (LEDs), organic light emitting diodes (OLEDs), xenon bulbs, halogen bulbs, and electroluminescent (EL) light source (e.g., an EL panel or film).

In various embodiments, an internal reflector is mounted on the light element for providing an angular light dispersion. For some such embodiments, the internal reflector provides 15, 60, or 90 degrees of angular light dispersion. For other such embodiments, the internal reflector is adjustable to an angular light dispersion between 15 to 90 degrees.

In some embodiments, the mounting mechanism comprises: a fixture chassis configured to mount to the aquarium wall; and a screw to mount the modular light fixture to the fixture chassis. In other embodiments, the mounting mechanism comprises: a fixture chassis configured to mount to the aquarium wall; a resting bracket configured to rest on the fixture chassis; and a screw to mount the resting bracket to the modular light fixture.

In additional embodiments, the clear acrylic cover comprises an optical lens placed at a location on the clear acrylic cover below the light element. In some such embodiments, the optical lens provides 15, 60, or 90 degrees of angular light dispersion. In further such embodiments, the optical lens is adjustable to an angular light dispersion between 15 to 90 degrees. In other embodiments, the terminal strip utilizes a tabbed connection mechanism or a clip-connection mechanism to connect the power supply to the modular light fixture.

For some embodiments, the modular light fixture further comprises a thermal switch configured to shut power off to the modular light fixture when the modular light fixture is operating above a max operating temperature. For example, an embodiment may be configured with an internal thermal switch that turns off the terminal strip or the modular light fixture in the event that either or both are operating above the max operating temperature. Additionally, the thermal switch may be internal or external to the modular light fixture or the terminal strip.

For other embodiments, the modular light fixture further comprises an internal circuit configured to shut power off to the modular light fixture when the internal circuit detects a ground fault. For example, some embodiments may be configured with a ground fault circuit interrupter (GFCI) that protects a modular light fixture (or, alternatively, the entire lighting system) during a ground fault situation.

In additional embodiments, the modular light fixture is configured to be connected as a link in a daisy chain of modular light fixtures. In further embodiments, the modular light fixture further comprises a male power connection or a female power connection. In some embodiments, the power supply is configured with a power splitter to power two or more modular light fixtures.

In other embodiments, the aquarium lighting system further comprises a controller connected between the power supply unit and the modular light fixture, wherein the controller controls a parameter of the light element in the modular light fixture. Some example parameters controlled by the controller include, but are not limited to, color patterns, light intensity, and lighting timing.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a lighting system and apparatus that may be utilized with aquariums. The features and functionality of the lighting system and apparatus provide easy access to the opening of an aquarium for various purposes, such as cleaning and maintenance. In addition, the features and functionality of some embodiments provide for a lighting system that does not require ballasts, light sockets, or a multitude of wiring, and has a modular design. Further, for some embodiments, features of the present invention allow the lighting apparatus to illuminate the aquarium, while simultaneously limiting the evaporation of water from the aquarium.

Figure 1A:
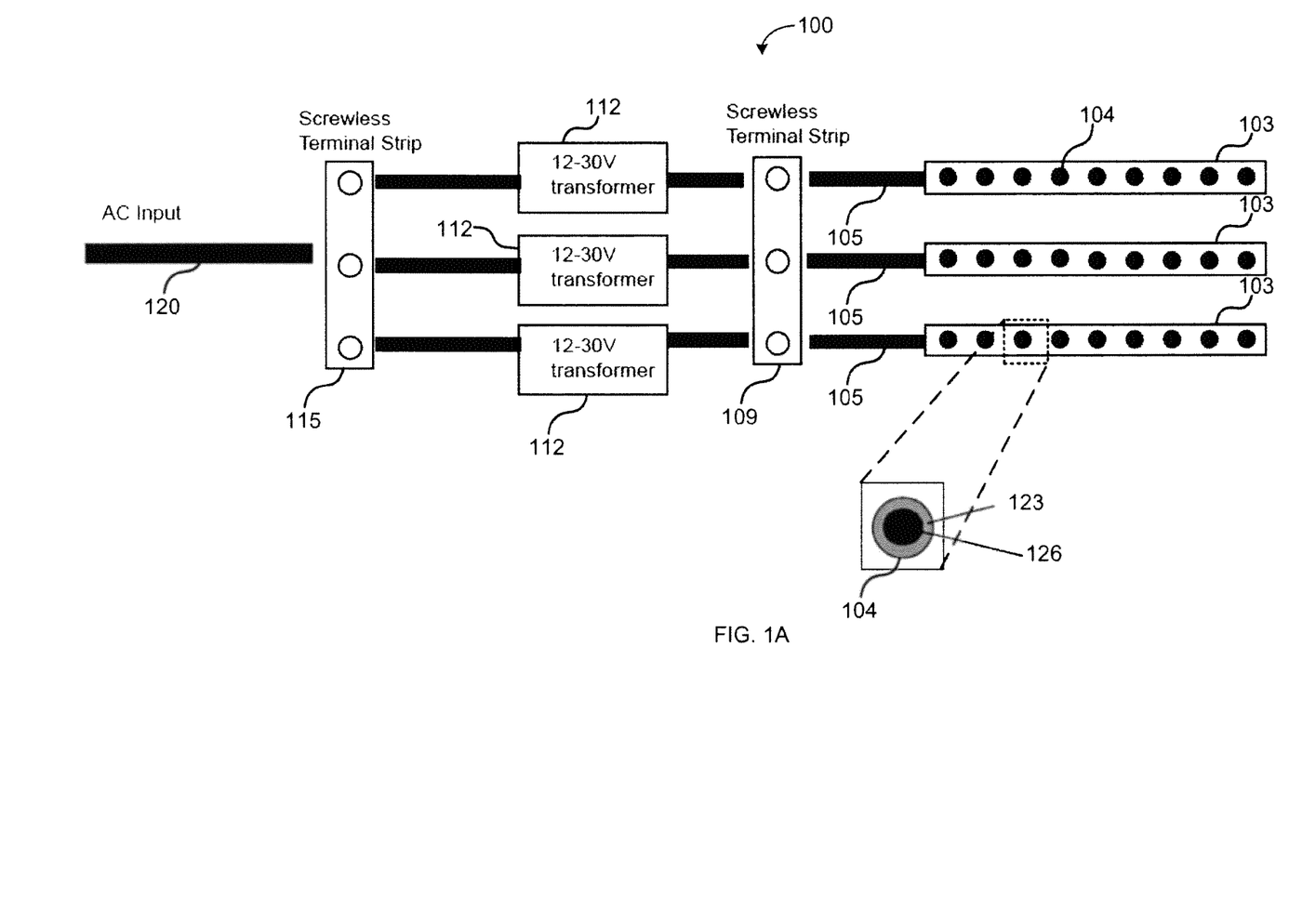
FIGS. 1A and 1B are diagrams illustrating example lighting systems in accordance with embodiments of the invention.

FIG. 1A is a diagram illustrating an example lighting system 100 in accordance with an embodiment of the invention. The illustrated lighting system comprises modular light fixtures 103, screw-less terminal strips 109 and 115, and 12 to 30-volt transformers 112. As illustrated, the modular light fixtures 103 comprise light elements 104, each of which comprises a light-emitting diode 126 and internal reflector 123. In some embodiments, the light element 104 may be mounted to a printed circuit board, which may be removable from the modular light fixture 103 and replaced when necessary. Additionally, the internal reflector provides a light dispersion adequate to illuminate an object, such as an aquarium. In some embodiments, the light elements 104 are arranged such that each light element's light dispersion overlaps with that of another light element's light dispersion.

Power to the individual modular light fixtures 103 is provided through individual power connections 105, which are each connected to a power supply unit 112 through a screw-less terminal strip 109. An additional screw-less terminal strip 115 connects each power supply 112 to an alternating current (AC) power supply 120. Through screw-less terminal strip 109, a modular light fixture 103 can be replaced without disturbing the other modular light fixtures 103, and through screw-less terminal strips 109 and 115, each power supply unit 112 can be replaced without disturbing the other power supply units 112. As further illustrated in FIG. 1, the alternating current (AC) from power connection 120 is converted into a 12-volt direct current (DC) for each modular light fixture 103, and the conversion is facilitated for each modular light fixture 103 by a corresponding 12-volt transformer (or driver) 112.

Figure 1B:
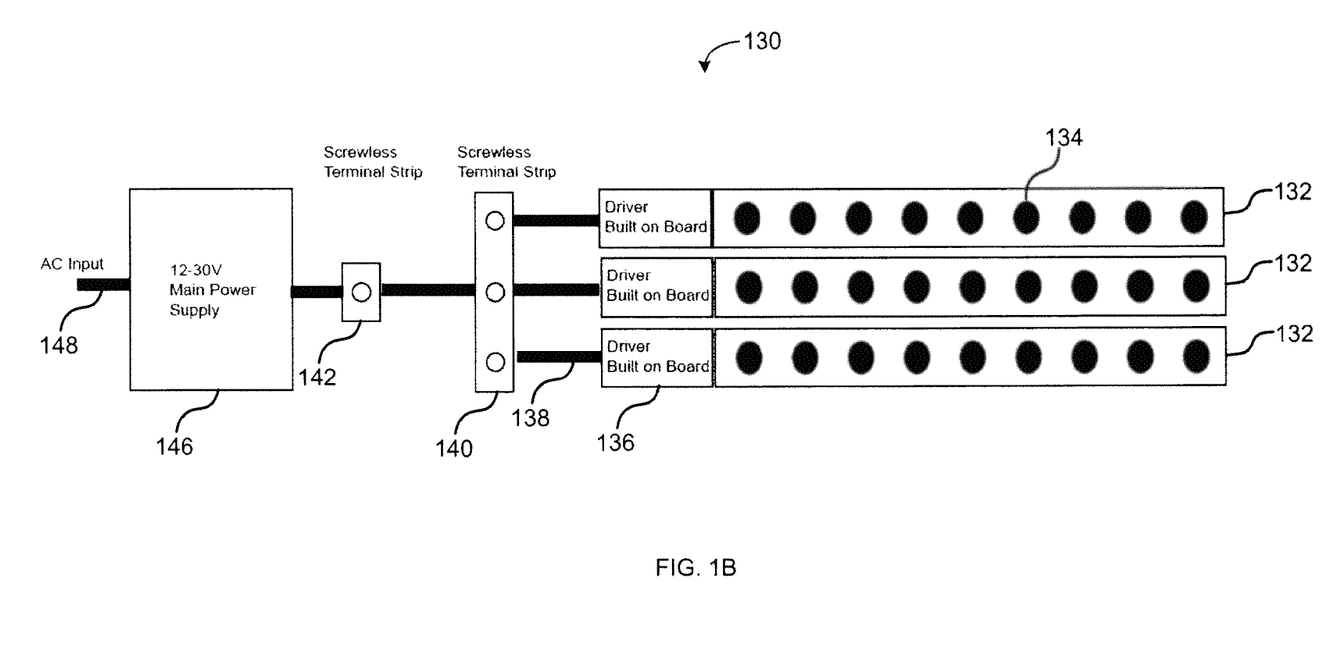

FIG. 1B is a diagram illustrating an example lighting system 130 in accordance with an embodiment of the invention. The illustrated lighting system comprises modular light fixtures 132, screw-less terminal strips 140 and 142, and 12-30 volt main power supply 146. As illustrated, the modular light fixtures 132 comprise light elements 134, and drivers 136 built into the modular light fixtures 132 that power the light elements 134. For some embodiments, the light elements 134 and the driver 136 for a given modular light fixture 132 are built onto a printed circuit board. Power connections 138 provide power to individual modular light fixtures 132 from the main power supply 146 through screw-less terminal strips 140 and 142.

Figure 2:
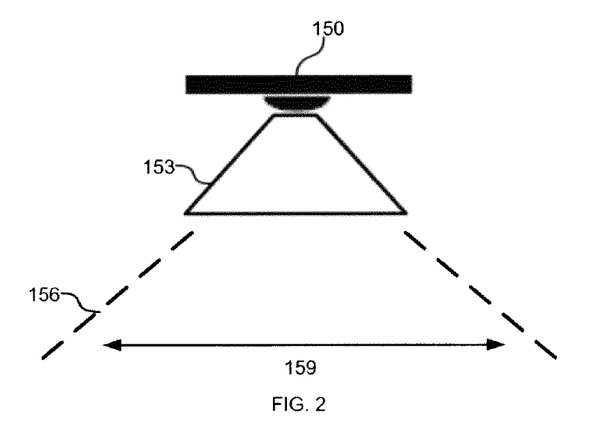
FIG. 2 is a diagram illustrating an example light element in accordance with an embodiment of the invention.

FIG. 2 is a diagram illustrating an example light element 150 in accordance with an embodiment of the invention. Referring now to FIG. 2, light element 150 can be configured with a light emitting diode (LED), an organic light emitting diode (OLED), a xenon bulb, a halogen bulbs, and an electroluminescent (EL) light source (e.g., an EL panel or film). Light element 150 is configured with optical lens 153 that provides for an angular light dispersion 156 to illuminate an object within the area 159 of light dispersion. For example, the angular light dispersion may be 15 degrees, 60 degrees, or 90 degrees. The area 159 of light dispersion depends on the distance from the light element 150.

Figure 3:
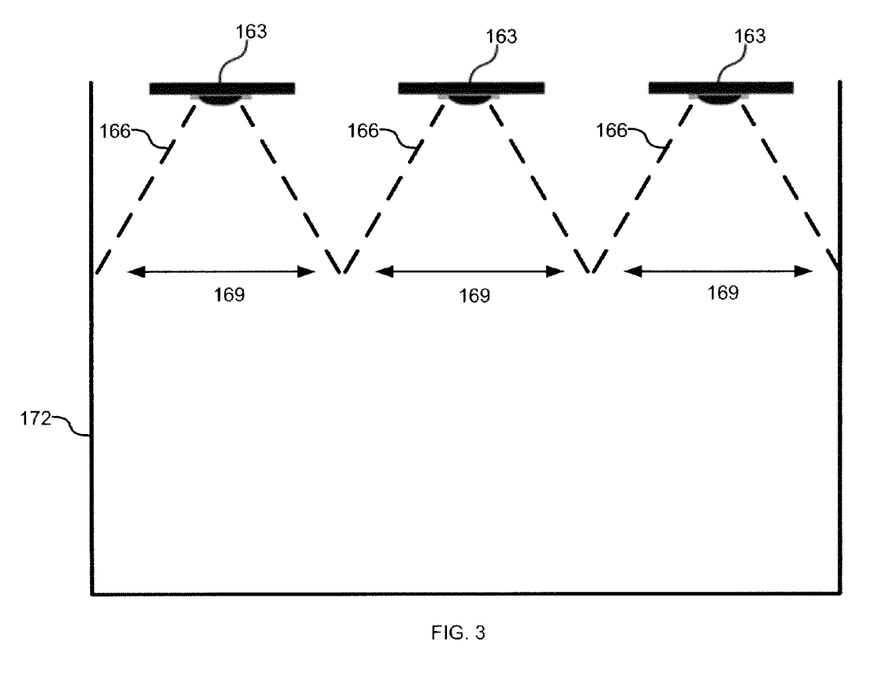
FIG. 3 is a diagram illustrating an example arrangement of modular lighting fixtures in accordance with an embodiment of the invention.

Turning now to FIG. 3, an example arrangement of modular lighting fixtures 163 is depicted in the context of an aquarium 172, in accordance with an embodiment of the invention. The modular light fixtures 163 are arranged such that the angular light dispersion 166 of each light fixture 163 overlaps with the light dispersion of an adjacent light fixture 163. In doing so, the modular light fixtures 163 provides adequate illumination for the aquarium.

Figure 4:
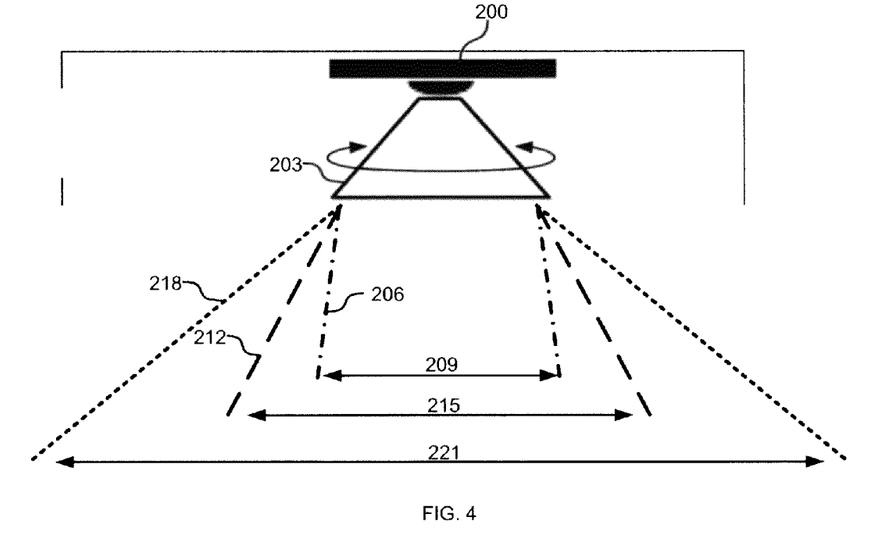
FIG. 4 is a diagram illustrating an example of an adjustable light element in accordance with an embodiment of the invention.

FIG. 4 illustrates a diagram of an alternative light element 200 that is adjustable in accordance with an embodiment of the invention. Specifically, the light element 200 is configured with an optical lens 203 that provides an adjustable angular light dispersion. The illustrated variable light dispersion (206, 212, and 218) and illumination area (209, 215, and 221, respectively) can be adjusted by rotating the optical lens 203 in a clockwise or counter-clockwise manner about the light element 200. For some embodiments, by twisting the optical lens 203 about the light element 200, the light element 200 telescopes closer or farther from the optical lens 203 and, thereby, changes the angular light dispersion caused by the optical lens 203.

Figure 5:
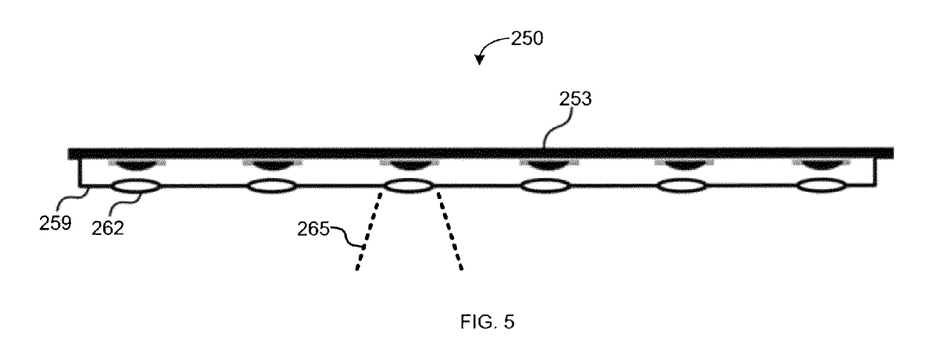
FIG. 5 is a diagram illustrating an example of light strip in accordance with an embodiment of the invention.
Figure 6:
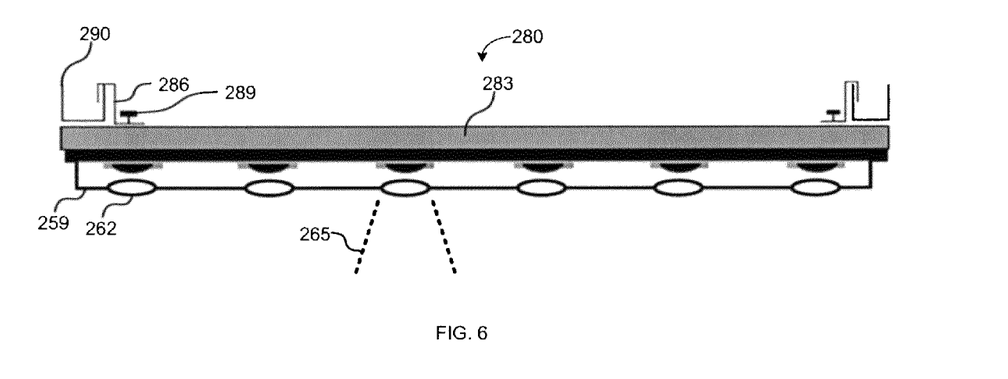
FIG. 6 is a diagram illustrating an example of light strip with a mounting mechanism in accordance with an embodiment of the invention.
Figure 7:
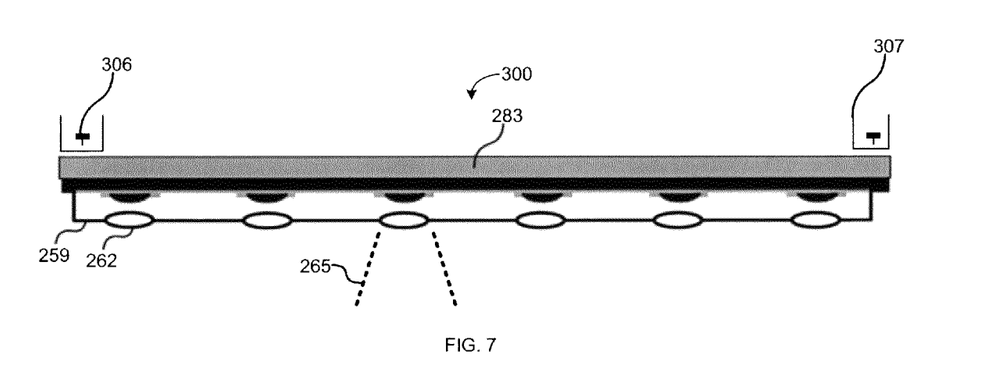
FIG. 7 is a diagram illustrating an example of light strip with another mounting mechanism in accordance with an embodiment of the invention.

FIG. 5 is a diagram illustrating an example light strip 250 in accordance with an embodiment of the invention. The light strip 250 comprises light elements 253, each having an optical lens 262 positioned in front of it that provides a light dispersion 265. In some embodiments, the light elements 253 are mounted to the light strip 250 via an internal frame (not shown). The light strip 250 can be constructed of, for example, aluminum, which allows for efficient heat dissipation upward and away from the source of heat, light elements 253. The optical lenses 262 illustrated are part of the cover 259, which both covers the internals of the light strip 250, and protect the light elements from water exposure. In some embodiments, the light strip 250 is further configured with a heat sink, which further provides heat dissipation for the light elements 253. FIGS. 6 and 7, as described below, depict two such embodiments.

FIG. 6 is a diagram illustrating an example light strip 280 configured with a heat sink 283, and a mounting mechanism (286, 289, 290), in accordance with an embodiment of the invention. The heat sink may be constructed of a material such as aluminum, which provides for efficient dissipation of heat produced by the lighting elements. It should be noted that for those embodiments used with an aquarium, the efficient heat dissipation mitigates the effect the light elements have on the aquarium to which they are mounted. Such heat dissipation increases the life span of the light elements, mitigates the harm to the marine life caused by the heat, and lessens the rate of water evaporation caused by the heat.

The mounting mechanism allows for the light strip 280 to mount to an aquarium wall. In the illustrated configuration, the mounting mechanism comprises a fixture chassis 290, which can be mounted to the aquarium wall, resting brackets 286 configured to rest on the fixture chassis 290, and screws 289 to mount the resting brackets to the light strip 280.

Similarly, FIG. 7 illustrates a light strip 300, but with an alternative mounting mechanism (306, 307) in accordance with an embodiment of the invention. As illustrated, the mounting mechanism of FIG. 7 comprises a fixture chassis 307, which is attached to light strip 300 using screws 306.

Figure 8:
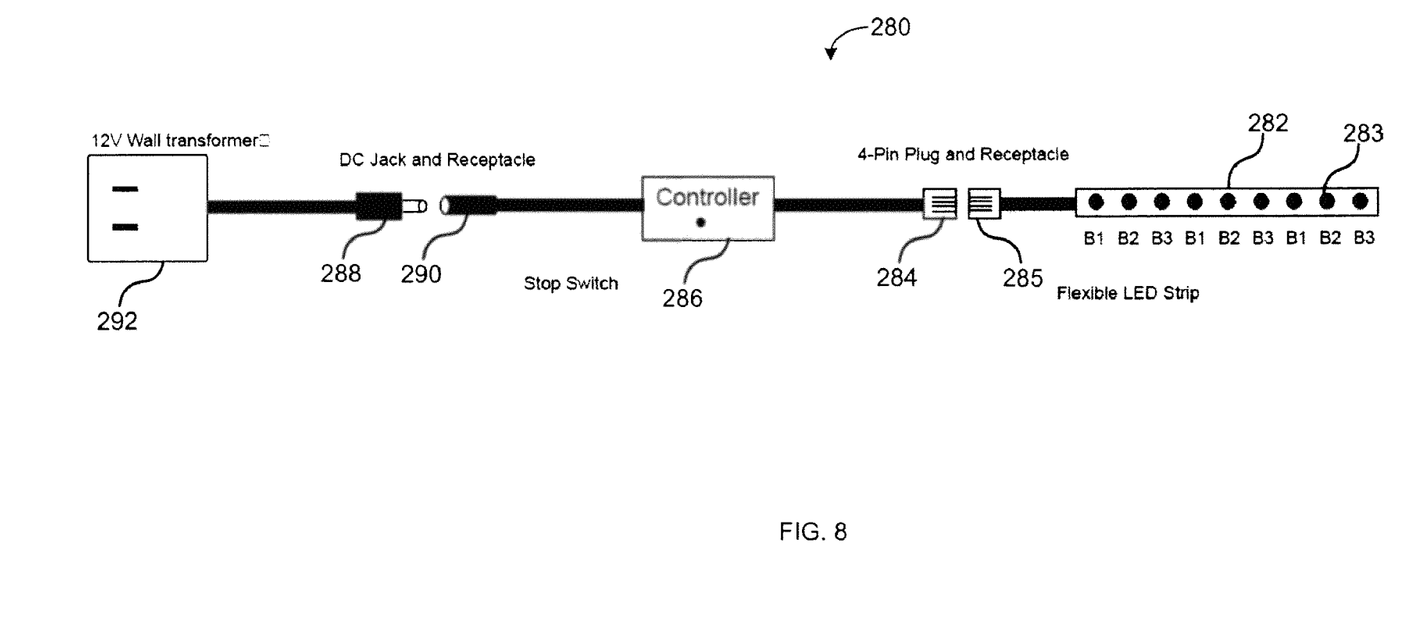
FIG. 8 is a diagram illustrating an example lighting system in accordance with an embodiment of the invention.

FIG. 8 is a diagram illustrating a lighting system 280 in accordance with an embodiment of the invention. The lighting system 280 comprises a 12-volt wall transformer 292, a light controller 286, and a modular light fixture 282 comprising light elements 283. The modular light fixture 282 may be configured with a series of identically colored light elements (e.g., blue light-emitting diodes) that allow for variable light intensity, or a series of blue, red, and green light elements that allow for different color patterns. In lighting system 280, the modular light fixture 282 is configured as a flexible light-emitting diode (LED) strip.

The light controller 286 illustrated may be used in some embodiments to control the behavior and parameters of the light elements 283 within the modular light fixture 282. For example, light controller 286 may control the color pattern, light intensity, or timing of light patterns emitted from the modular light fixture 282. Additionally, the light controller 286 may be configured with a stop switch, which when engaged would cause the controller 286 to stop or pause the logic the controller 286 is performing through the modular light fixture 282.

For modularity, some embodiments are implemented with tool-less connectors that allow for easy removal and replacement of components of the lighting system. For example, in the lighting system 280, the system is configured with a direct current (DC) jack 288 and DC receptacle 290, allowing the wall transformer 292 to be easily disconnected from the lighting system 280 without the need for tools. Similarly, lighting system 280 is further configured with a 4-pin plug 284 and receptacle 285, which allows the controller 286 and/or the modular light fixture 282 to be easily disconnected from the lighting system 280.

Figure 9A:
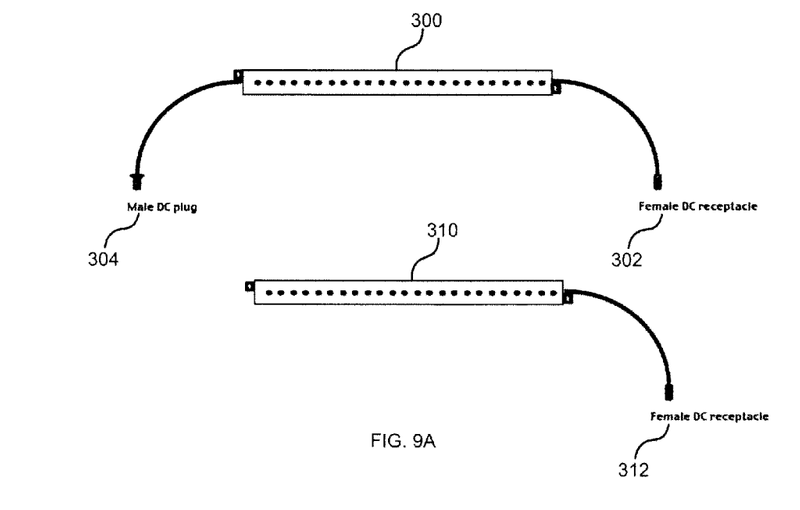
FIGS. 9A and 9B are diagrams illustrating example modular light fixtures in accordance with embodiments of the invention.

In certain embodiments of the invention, the modular light fixtures are further configured with male and/or female power connectors that allow the modular light fixture to be implemented in a daisy chain configuration with other modular light fixtures. Examples of such modular light fixtures are illustrated in FIG. 9A. Referring now to FIG. 9A, modular light fixture 300 is configured with a male DC plug 304 and a female DC receptacle 302, allowing it to be connected directly to (i) a power supply unit, (ii) one modular light fixture in a daisy chain configuration, (iii) one modular light fixture and a power supply unit in a daisy chain configuration, or (iv) two modular light fixtures in a daisy chain configuration. In some embodiments, the modular light fixtures are flexible light-emitting diode (LED) strips.

Figure 9B:
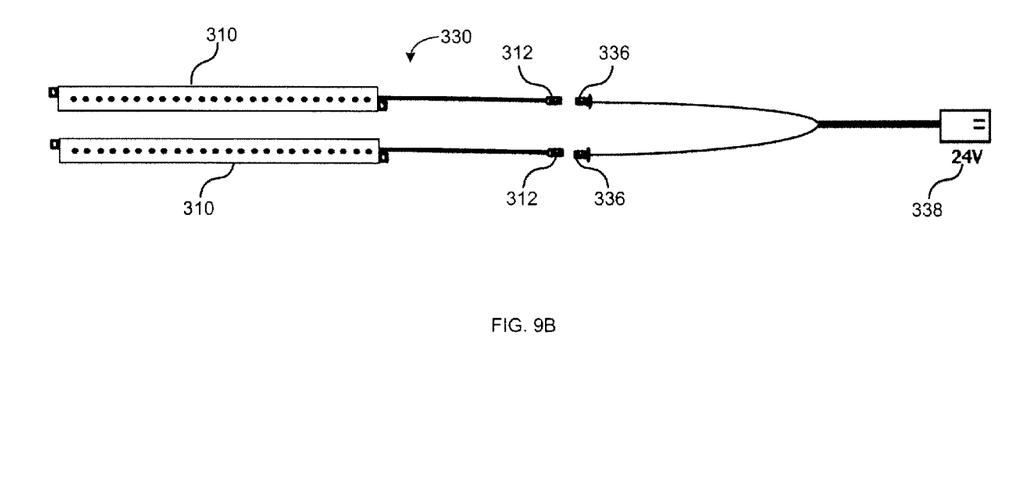

Optionally, for modular light fixtures that are connected at the end of a daisy chain configuration, or directly to a power supply unit, the modular light fixture may be configured with only a male plug or a female receptacle. Such is the case for modular light fixture 310, which is configured with only a female DC receptacle 312, which can accept a male plug from a power supply unit or a male plug from another modular light fixture having a male DC plug (e.g., modular light fixture 300). In alternative embodiments, a lighting system can be configured with two or more modular light fixtures such light fixture 310, and powered by a single power unit having a splitter. Such is the case in FIG. 9B, where lighting system 330 comprises a 24 volt power supply 338 having a splitter with male DC plugs 336.

Figure 10A:
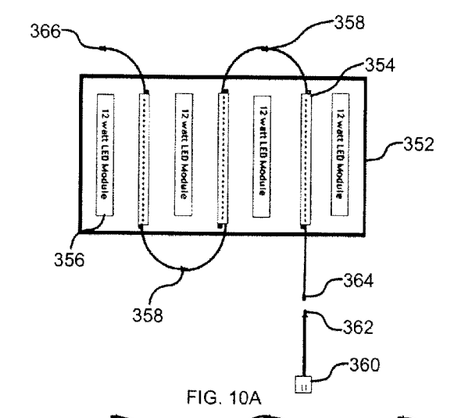
FIGS. 10A and 10B are diagrams illustrating example lighting systems in accordance with embodiments of the invention.

FIG. 10A is diagram illustrating an example lighting system 352 in accordance with an embodiment of the invention, wherein the modular light fixtures 354 are installed in a daisy chain configuration via connection points 358. In some embodiments, the connections points 358 comprise a male power plug and a female power receptacle, similar to those of 366 and 364, respectively. The lighting system 352 also comprises a modular power supply 360 that can be easily disconnected from the system via the male power plug 362 of the power unit and female power receptacle 364 of one of the modular light fixtures 354. As illustrated, the lighting system 352 is additionally configured with 12 watt light-emitting diode modules 356 to accompany the modular light fixtures 354.

Figure 10B:
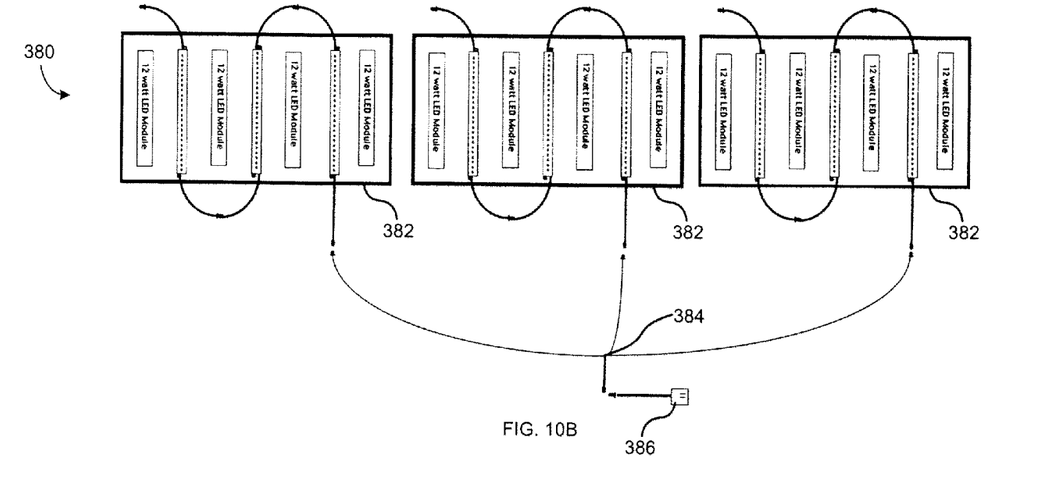

Optionally, the lighting system 352 can be powered by a power unit commonly shared with other lighting systems via the female power receptacle 364. Such an example configuration is illustrated in light configuration 380 of FIG. 10B, where the lighting systems 382 are commonly powered by power supply 386, which provides power to each of the systems through an attached power splitter 384.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An aquarium lighting system, comprising:
    a modular light fixture, comprising:
        a light strip
        a plurality of light elements mounted to the light strip;
        a heat sink mounted to the light strip and configured to dissipate heat generated by the light elements; and
        a clear acrylic cover that covers the light elements from water exposure, wherein the clear acrylic cover comprises a plurality of adjustable optical lenses, each optical lens placed at a location on the clear acrylic cover below each of the plurality of light elements for providing an adjustable angular light dispersion; and
    a power supply unit that is electrically coupled to the modular light fixture, wherein the power supply unit supplies power to the modular light fixture.

2. The aquarium lighting system of claim 1 wherein the modular light fixture further comprises a thermal switch configured to shut power off to the modular light fixture when the modular light fixture is operating above a maximum operating temperature.

3. The aquarium lighting system of claim 1, wherein the modular light fixture further comprises an internal circuit configured to shut power off to the modular light fixture when the internal circuit detects a ground fault.

4. The aquarium lighting system of claim 1, wherein each optical lens provides 15, 60, or 90 degrees of angular light dispersion.

5. The aquarium lighting system of claim 1, wherein each optical lens is adjustable to an angular light dispersion between 15 to 90 degrees.

6. The aquarium lighting system of claim 1, wherein the power supply unit is electrically coupled to the modular light fixture through a terminal strip, and the terminal strip provides a screw-less connection between the power supply unit and the modular light fixture.

7. The aquarium lighting system of claim 6, wherein the terminal strip utilizes a tabbed connection mechanism or a clip-connection mechanism to connect the power supply to the modular light fixture.

8. The aquarium lighting system of claim 6, wherein the power supply unit is a direct current driver and the aquarium lighting system further comprises a second terminal strip, wherein the second terminal strip connects the direct current driver to an alternating current power supply.

9. The aquarium lighting system of claim 1, wherein the power supply unit is a direct current driver.

10. The aquarium lighting system of claim 9, further comprising a second terminal strip, wherein the second terminal strip connects the direct current driver to an alternating current power supply.

11. The aquarium lighting system of claim 9, wherein the power supply unit is located on the modular light fixture.

12. The aquarium lighting system of claim 1, wherein the heat sink is constructed of aluminum.

13. The aquarium lighting system of claim 1, wherein an internal reflector is mounted on each light element for providing an angular light dispersion.

14. The aquarium lighting system of claim 13, wherein the internal reflector provides 15, 60, or 90 degrees of angular light dispersion.

15. The aquarium lighting system of claim 13, wherein the internal reflector is adjustable to an angular light dispersion between 15 to 90 degrees.

16. The aquarium lighting system of claim 1, further comprising a mounting mechanism configured to mount the modular light fixture onto an aquarium wall.

17. The aquarium lighting system of claim 16, wherein the mounting mechanism comprises:
a fixture chassis configured to mount to the aquarium wall; and
a screw to mount the modular light fixture to the fixture chassis.

18. The aquarium lighting system of claim 17, wherein the mounting mechanism comprises:
a resting bracket configured to rest on the fixture chassis; and
a screw to mount the resting bracket to the modular light fixture.

19. The aquarium lighting system of claim 1, wherein each light element is removable.

20. The aquarium lighting system of claim 1, wherein each light element includes a light emitting diode, an organic light emitting diode, a xenon bulb, a halogen bulb, or an electroluminescent light source.

21. The aquarium lighting system of claim 1, wherein each light element is mounted on a printed circuit board.

22. The aquarium lighting system of claim 1, wherein the modular light fixture is configured to be connected as a link in a daisy chain of modular light fixtures.

23. The aquarium lighting system of claim 1, wherein the modular light fixture further comprises a male power connection or a female power connection.

24. The aquarium lighting system of claim 1, wherein the power supply unit is configured with a power splitter to power two or more modular light fixtures.

25. The aquarium lighting system of claim 1, further comprising a controller connected between the power supply unit and the modular light fixture, wherein the controller controls a parameter of each light element in the modular light fixture.

26. The aquarium lighting system of claim 25, wherein the parameter includes a color pattern, lighting pattern, light intensity, and light timing.

* * * * *